US010410317B1

(12) United States Patent
Phogat et al.

(10) Patent No.: US 10,410,317 B1
(45) Date of Patent: Sep. 10, 2019

(54) DIGITAL IMAGE TRANSFORMATION ENVIRONMENT USING SPLINE HANDLES

(71) Applicant: Adobe Inc., San Jose, CA (US)

(72) Inventors: Ankit Phogat, Noida (IN); Vineet Batra, Pitam Pura (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/936,299

(22) Filed: Mar. 26, 2018

(51) Int. Cl.
*G06T 3/00* (2006.01)
(52) U.S. Cl.
CPC .......... *G06T 3/0093* (2013.01); *G06T 3/0068* (2013.01); *G06T 2200/24* (2013.01)
(58) Field of Classification Search
None
See application file for complete search history.

(56) References Cited

U.S. PATENT DOCUMENTS

| | | | | |
|---|---|---|---|---|
| 5,611,036 A * | 3/1997 | Berend | ................. | G06T 11/001 345/441 |
| 5,861,889 A * | 1/1999 | Wallace | .............. | G06F 3/04845 345/619 |
| 5,894,310 A * | 4/1999 | Arsenault | ........... | G06F 3/04845 345/419 |
| 6,154,221 A * | 11/2000 | Gangnet | ............... | G06T 11/203 345/442 |
| 6,441,823 B1 * | 8/2002 | Ananya | ................. | G06T 11/203 345/442 |
| 6,448,964 B1 * | 9/2002 | Isaacs | ................... | G06F 3/0362 345/419 |
| 6,781,597 B1 * | 8/2004 | Vrobel | ................ | G06F 3/04815 345/619 |
| 6,919,888 B1 * | 7/2005 | Perani | ..................... | G06T 17/20 345/420 |
| 7,218,326 B1 * | 5/2007 | Bogues | ................. | G06T 11/203 345/441 |
| 7,302,650 B1 * | 11/2007 | Allyn | .................. | G06F 3/04812 715/792 |
| 7,496,416 B2 * | 2/2009 | Ferguson | ............. | G06T 11/203 345/442 |

(Continued)

OTHER PUBLICATIONS

Weng et al., Sketching MLS Image Deformations on the GPU, Pacific Graphics 2008, vol. 27, pp. 1789-1796 (Year: 2008).*

(Continued)

*Primary Examiner* — Motilewa Good Johnson
(74) *Attorney, Agent, or Firm* — SBMC

(57) ABSTRACT

A digital image transformation environment is described that employs spline handles. A spline handle is generated by a spline handle generation module of the computing device based on a segment with respect to artwork in a digital image as including control points. A second user input is then received as moving an internal point on the spline handle between the first and second endpoints from a first location to a second location in the user interface. In response, the spline handle generation module regenerates the segment of the spline handle as including the internal point at the second location by adjusting a tangent handle. Next, a digital image transformation module is employed to determine a transformation to be applied to the artwork based on the regenerated segment of the spline handle, which is applied to the artwork.

20 Claims, 12 Drawing Sheets

(56) References Cited

U.S. PATENT DOCUMENTS

| | | | |
|---|---|---|---|
| 7,884,834 B2* | 2/2011 | Mouilleseaux | G06T 11/203 345/441 |
| 8,004,539 B2* | 8/2011 | McDaniel | G06T 11/60 345/619 |
| 8,629,871 B2 | 1/2014 | O'Brien et al. | |
| 8,830,226 B2* | 9/2014 | Goossens | G06F 3/04815 345/419 |
| 8,994,736 B2* | 3/2015 | Carr | G09G 5/00 345/420 |
| 9,024,938 B2* | 5/2015 | Joshi | G06T 19/20 345/419 |
| 9,454,797 B2 | 9/2016 | Popovic et al. | |
| 2003/0033050 A1* | 2/2003 | Yutkowitz | G05B 19/4103 700/189 |
| 2005/0237325 A1 | 10/2005 | Motter et al. | |
| 2007/0038421 A1 | 2/2007 | Hu et al. | |
| 2009/0213143 A1 | 8/2009 | Igarashi | |
| 2010/0214312 A1* | 8/2010 | Weber | G06T 13/80 345/593 |
| 2012/0154397 A1 | 6/2012 | Chernikov et al. | |
| 2013/0300736 A1 | 11/2013 | Schmidt | |
| 2014/0104266 A1 | 4/2014 | Stone et al. | |
| 2019/0197771 A1 | 6/2019 | Batra et al. | |
| 2019/0206100 A1 | 7/2019 | Batra et al. | |

OTHER PUBLICATIONS

Igarashi et al., As-Rigid-As-Possible Shape Manipulation, ACM 2005, pp. 1134-1141 (Year: 2005).*

Shaefer et al., Image Deformation Using Moving Least Squares, ACM 2006, pp. 533-540 (Year: 2006).*

Komerska et al., Haptic Gdraw: A fun and Easy to Use 3D Haptically Enhanced Sculpting Program, EuroHaptics 2004, pp. 436-439 (Year: 2004).*

"Adobe Illustrator CC Tutorials", Retrieved at: https://helpx.adobe.com/in/illustrator/how-to/dynamic-symbols.html—on Jan. 8, 2019, 8 pages.

"Barycentric coordinate system—Wikipedia", https://en.wikipedia.org/wiki/Barycentric_coordinate_system—Retrieved on Oct. 11, 2017, 9 pages.

"Bounding volume hierarchy—Wikipedia", https://en.wikipedia.org/wiki/Bounding_volume_hierarchy—Retrieved on Oct. 11, 2017, 3 pages.

"First Action Interview Office Action", U.S. Appl. No. 15/852,924, dated Oct. 11, 2018, 5 pages.

"Kabsch algorithm—Wikipedia", Retrieved at: https://en.wikipedia.org/wiki/Kabsch_algorithm—Sep. 27, 2017, 4 pages.

"Pre-Interview First Office Action", U.S. Appl. No. 15/852,924, dated Jul. 27, 2018, 4 pages.

"Ramer-Douglas-Peucker algorithm—Wikipedia", https://en.wikipedia.org/wiki/Ramer%E2%80%93Douglas%E2%80%93Peucker_algorithm—Retrieved on Oct. 11, 2017, 4 pages.

Au,"Skeleton Extraction by Mesh Contraction", ACM Trans. Graph., 27(3):44:1{44: 10,, Aug. 2008, 10 pages.

Batra,"Digital Media Environment for Intuitive Modifications of Digital Graphics", U.S. Appl. No. 15/852,924, filed Dec. 22, 2017, 60 pages.

Batra,"Generating A Triangle Mesh for an Image Represented by Curves", U.S. Appl. No. 15/861,908, filed Jan. 4, 2018, 80 pages.

Boye,"A Vectorial Solver for Free-form Vector Gradient", ACM Trans. Graph. 31, 6, Article 173, Sep. 17, 2012, 10 pages.

De"Vector Field Processing on Triangle Meshes", In SIGGRAPH Asia 2015 Courses (SA'15), Nov. 2, 2015, 49 pages.

Jacobson,"Bounded Biharmonic Weights for Real-Time Deformation", In ACM SIGGRAPH 2011 Papers, SIGGRAPH '11, Jul. 2011, 8 pages.

Jacobson,"Fast Automatic Skinning Transformations", ACM Trans. Graph. 31, Jul. 2012, 10 pages.

Liu,"Skinning Cubic Bezier Splines and Catmull-Clark Subdivision Surfaces", ACM Trans. Graph., 33(6):190:1{190:9, Nov. 19, 2014, 9 pages.

Phogat,"Bone Handle Generation", U.S. Appl. No. 16/241,719, filed Jan. 7, 2018, 42 pages.

Schneider,"An Algorithm for Automatically Fitting Digitized Curves", Academic Press Professional, Inc., San Diego, CA, USA, 1990., Aug. 1, 1990, pp. 612-626.

Shewchuk,"Triangle: Engineering a 2D Quality Mesh Generator and Delaunay Triangulator", Applied Computational Geometry: Towards Geometric Engineering, Lin M.C., Manocha D., (Eds.), val. 1148 of Lecture Notes in Computer Science. Springer-Verlag, May 1996, pp. 203-222. From the First ACM Workshop on Applied Computational Geometry., May 1996, 10 pages.

Visvalingam,"The Douglas-Peuker Algorithm for Line Simplification: Re-evaluation through Visualization", Sep. 1990, pp. 213-228.

"Notice of Allowance", U.S. Appl. No. 15/861,908, dated Apr. 3, 2019, 14 pages.

"Pre-Interview First Office Action", U.S. Appl. No. 15/861,908, dated Jan. 18, 2019, 22 pages.

"Final Office Action", U.S. Appl. No. 15/852,924, dated Apr. 30, 2019, 17 pages.

"Combined Search and Examination Report", GB Application No. 1816796.5, dated Apr. 17, 2019, 5 pages.

Martins,"Bezier Curve Quick Tips: Two Methods for Smooth Curves", Posted Sep. 16, 2014; https://learn.scannerlicker.net/2014/09/16/bezier-curve-quick-tips-two-methods-for-smooth-curves/, Sep. 16, 2014, 11 pages.

* cited by examiner

DIGITAL IMAGE TRANSFORMATION ENVIRONMENT USING SPLINE HANDLES

BACKGROUND

Conventional linear blend skinning techniques are used by computing devices to transform digital images. For example, an animator may create an initial digital image through interaction with a computing device. Linear blend skinning techniques are then used to makes changes to that initial image to form different variations of the initial image to form frames of the animation. To do so, different handle types may be specified in relation to the digital image as part of the linear blend skinning to deform artwork in the digital image in order to make the changes.

Although these conventional types of handles may work well for workflows like animation, these conventional types of handles may fail when confronted with other types of artwork, like vector graphics. For example, conventional bone handles are limited to pivoting around a joint, and thus a deformation based on this bone handle follows real-world physics that is useful in animation. Other examples of conventional handles, such as point and cage handles, are also limited to user interaction at discreet points in their geometry.

Thus, other types of artwork like vector graphics that support a wider range of workflows involving a greater degree of artistic freedom are limited by these conventional techniques. For instance, conventional techniques may require users to plot a multitude of these conventional handles manually through interaction with the computing device in order to obtain a fine level of control, especially to follow curves, which is tedious and adversely affects operation of the computing device. This may even prevent these conventional techniques from functioning on computing devices having limited resources, e.g., mobile devices, and limited these conventional techniques from doing so in real time.

SUMMARY

A digital image transformation environment is described to transform a digital image using a spline handle. The spline handle supports user interactions with a computing device that are not possible using conventional techniques, thereby improving user interaction and operational efficiency of the computing device. A user, for instance, may enter a series of points, sketch a freeform line, or use any other technique to draw a segment (e.g., a curved or straight line) in relation to artwork in a digital image. In response, a spline handle generation module generates a spline handle having control points (i.e., handles) that include end points and tangent handles that specify a direction of the segment.

A user may then interact with a user interface to "grab" any point of the spline handle along the segment. The computing device then uses changes to the spline handle to control transformations made to artwork associated with that segment, e.g., underlying. The computing device, for instance, may detect movement of an internal point along the segment of the spline handle as a result of user interaction with a user interface. In response, the computing device refits the segment of the spline automatically and without user intervention in real time as the internal point is moved. To do so in one example, the computing device uses an initial and final (e.g., current) position of the internal point to adjust a tangent handle used to define a direction of a curve of the segment. This is used by the computing device to regenerate the segment of the curve to include the internal point at the final (e.g., current) position in the user interface.

The adjustment to the tangent handle is then used as a basis to transform the artwork. The computing device, for instance, uses the initial and final position of the internal point to compute a transformation to be applied to the artwork, e.g., a translation, rotation, or scaling transformation. This may be performed in a variety of ways, such as to compute a transformation matrix. Further, increased operational efficiency supported by the spline handle supports output of the transformation in real time, even using computing device having limited processing resources, e.g., mobile devices.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
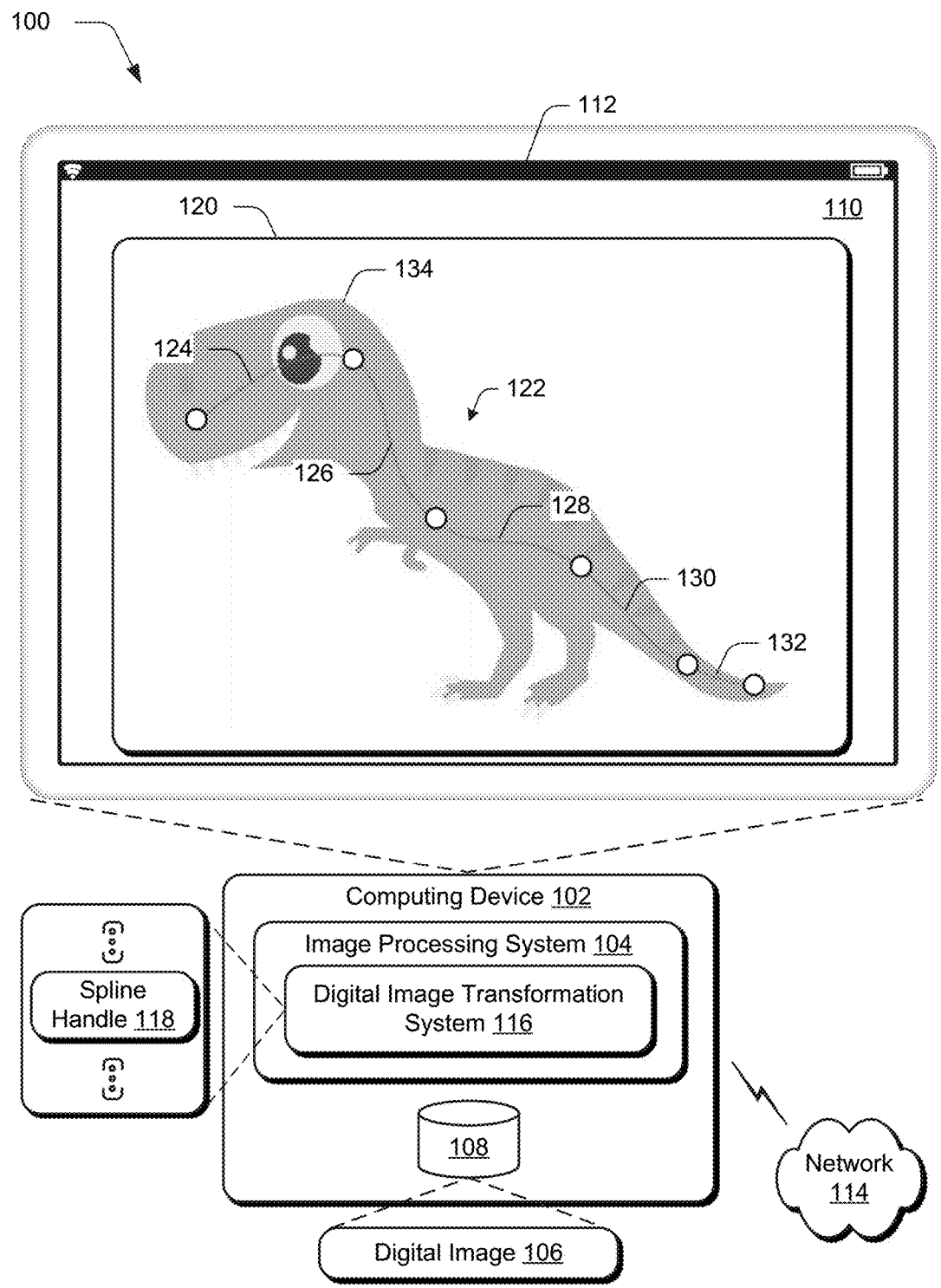
FIG. 1 is an illustration of an environment in an example implementation that is operable to employ digital image transformation techniques using spline handles as described herein.

A digital image environment is described using techniques and systems to transform a digital image using a spline handle. The spline handle supports user interactions with a computing device that are not possible using conventional techniques, thereby improving user interaction and operational efficiency of the computing device.

In one example, the spline handle is defined by the computing device using a curve, such as a cubic Bezier curve. For instance, a series of points maybe input via user interaction with a user interface to define a curve in a segment. In this way, the segment may be drawn to follow the curve of the tail in this example. In another instance, a user may draw a freeform line in a user interface to define a segment as also following artwork in a digital image. A curve is then fit to this segment by the computing device, which may be performed using a cubic Bezier curve or other curve. Regardless of how input, the curve is used to generate a spline handle. This overcomes the challenges of conventional techniques that require use of a multitude of individual handles to form a series of straight segments to follow the curve, e.g., bone handles. As a result, accuracy and operational efficiency of the computing device is improved through use of a fewer number of handles.

The spline handle may also be configured to support user interaction along both of the endpoints as well as at any internal point along the segment of the spline handle between the endpoints. A user, for instance, may interact with a user interface to "grab" any point of the spline handle along the segment. The computing device then uses changes to the spline handle to control transformations made to underlying artwork under that segment. In this way, the spline handle acts in an intuitive manner as a controlling structure for transforming the artwork based on changes that are directly made to the segment of the spline handle. This may be used to support a variety of transformations, including translation, rotation, and scaling of the artwork. As a result, the spline handle supports intuitive user interactions with increased accuracy over conventional techniques.

The computing device, for instance, may detect movement of an internal point along the segment of the spline handle as a result of user interaction with a user interface. In response, the computing device refits the segment of the spline automatically and without user intervention in real time as the internal point is moved. To do so in one example, the computing device uses an initial and final (e.g., current) position of the internal point to adjust a tangent handle used to define a direction of a curve of the segment. This is used by the computing device to regenerate the segment of the curve to include the internal point at the final (e.g., current) position in the user interface.

The adjustment to the tangent handle is then used as a basis to transform the artwork. The computing device, for instance, uses the initial and final position of the internal point to compute a transformation to be applied to the artwork, e.g., a translation, rotation, or scaling transformation. The transformation is combined by the computing device with a weight that is handle specific. These weights are then combined and used to control an amount of the transformation that is to be applied to respective components of an artwork, e.g., vertices in a triangle mesh.

The spline handle may also support relative scaling of components of an input geometry of artwork in a digital image, e.g., a vector graphic. An internal point of the spline handle, for instance, may be moved in a user interface from any point along the length of the spline handle, thereby causing a change in a midpoint of the spline handle. This causes the computing device to change a relative scale to underlying components of the artwork in proportion to a length of the segment of the spline handle in relation to an amount the internal point is moved in the user interface. This is not possible using conventional handle types, which are previously described are inefficient, often required often tedious user inputs to generate a multitude of handles, and hindered operation of a computing device.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital image transformation techniques using spline handles as described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 13.

The computing device 102 is illustrated as including an image processing system 104. The image processing system 104 is implemented at least partially in hardware of the computing device 102 to process and transform a digital image 106, which is illustrated as maintained in storage 108 of the computing device 102. Such processing includes creation of the digital image 106, modification of the digital image 106, and rendering of the digital image 106 in a user interface 110 for output, e.g., by a display device 112. Although illustrated as implemented locally at the computing device 102, functionality of the image processing system 104 may also be implemented as whole or part via functionality available via the network 114, such as part of a web service or "in the cloud."

An example of functionality incorporated by the image processing system 104 to process the image 106 is illustrated as a digital image transformation system 116 that is configured to support application of transformations to the digital image 106 using spline handles 118. Spline handles 118 may be used as part of linear blend skinning techniques that are used to deform a mesh of skeletal structures through use of different handle types. As previously described, conventional handles types used for linear blend skinning, such as point, bone, and cage handles, limit user interaction to predefined control points, such as at joints between segments for bone handles. Further, conventional handle types are limited to drawing straight-line segments. Therefore, when used to follow the curve of a tail, for instance, a multitude of conventional handles are required, which could be inaccurate and hinder operation of the computing device.

The spline handle 118 of the digital image transformation system 116, on the other hand, may assume any curvature or structure thereby increasing a user's ability to control transformations to artwork. As illustrated for the digital image 120 rendered in the user interface 110 of the display device 112, a spline handle 122 is formed having first, second, third, fourth, and fifth segments 124, 126, 128, 130, 132. This may be formed in a variety of ways, such as through a series of user clicks to define the points successively, by drawing a freeform line, and so forth.

Each of the segments of the spline handle 122 define corresponding components of the artwork 134 that are to be transformed by the digital image transformation system 116 based on user interaction with the respective segments. In this way, a user may quickly and efficiently define which parts of the artwork 134 are to be transformed. Further, by supporting the use of curves, the spline handle 122 may be formed to follow a natural flow of the artwork 134 using a fewer number of handles in comparison with conventional handle types, thereby improving operation of the computing device 102. Further discussion of these and other examples is included in the following section and shown in corresponding figures.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Image Transformation System

Figure 2:
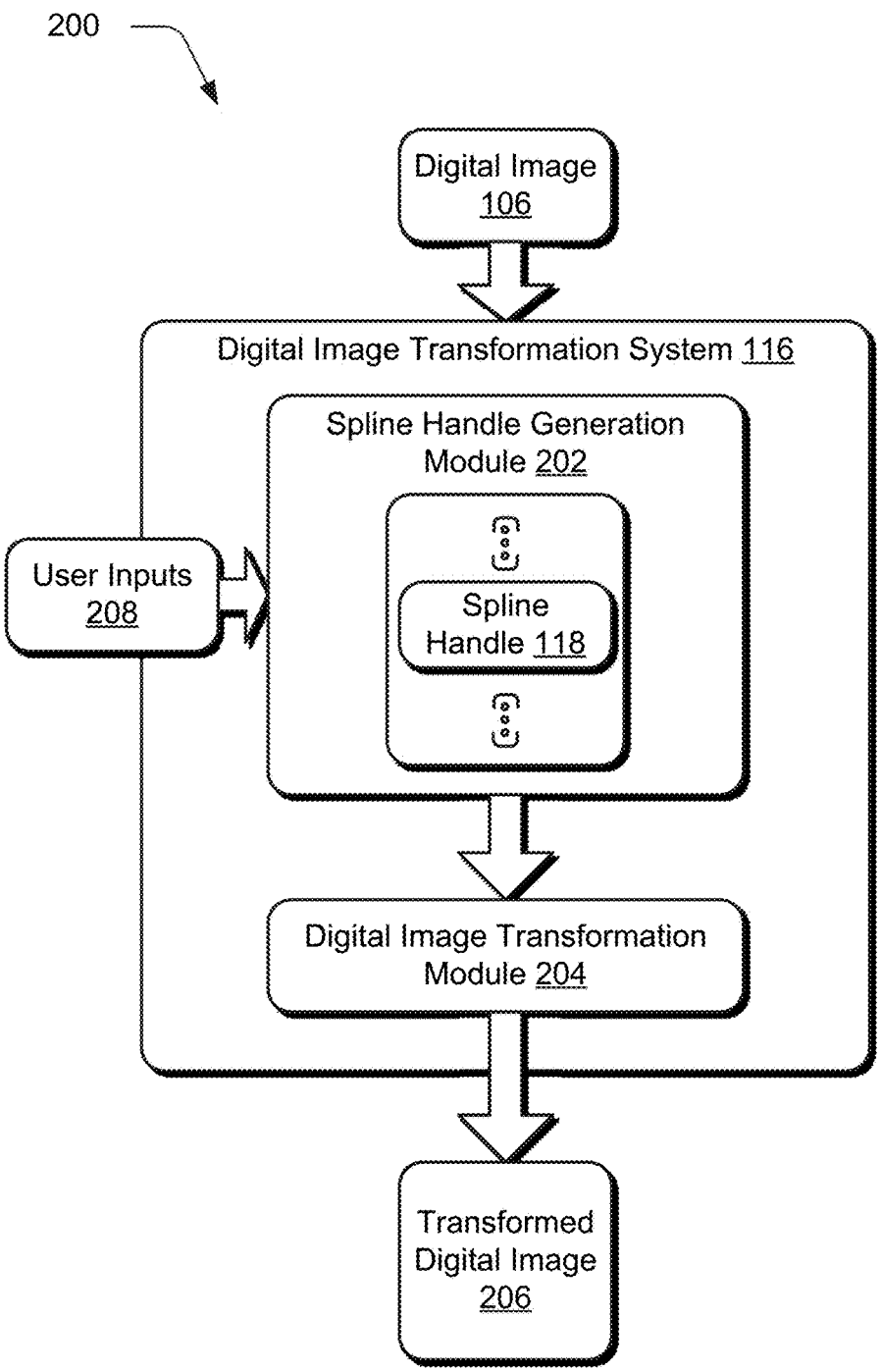
FIG. 2 depicts a system in an example implementation showing operation of a digital image transformation system of FIG. 1 in greater detail.

FIG. 2 depicts a system 200 in an example implementation showing operation of the digital image transformation system 116 in greater detail. The digital image transformation system 116 includes a spline handle generation module 202 that is implemented at least partially in hardware of the computing device 102 to generate and regenerate spline handles.

The spline handles 118 are used as a basis by a digital image transformation module 204 to generate a transformed digital image 206. This transformation is based on user interaction with the spline handles 118 detected via user inputs 208 received via a user interface 110.

Figure 3:
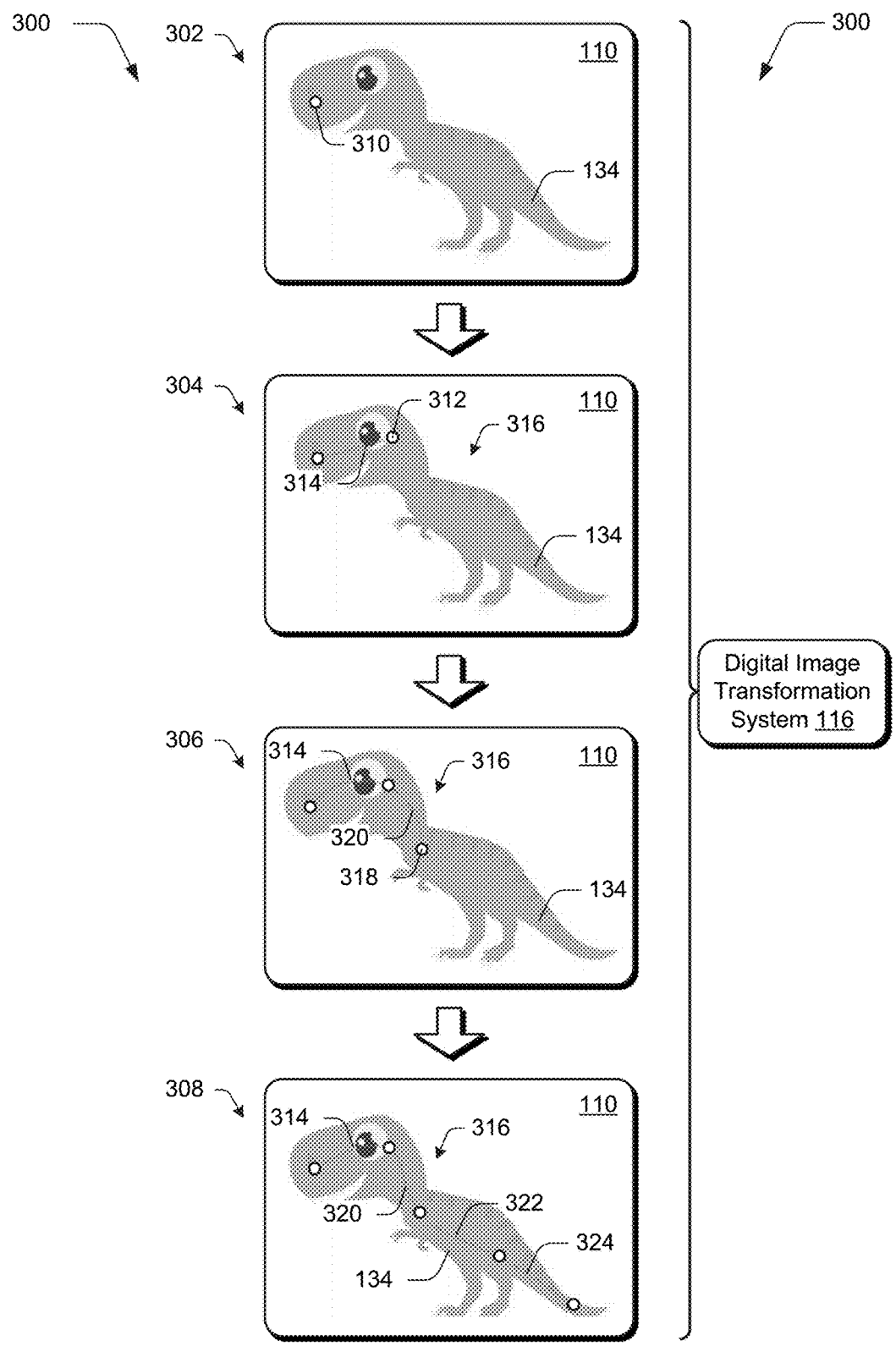
FIG. 3 depicts an example implementation of user interaction with a user interface to construct a spline handle.

FIG. 3 depicts an example implementation 300 of user interaction with a user interface 110 to construct a spline handle 122. This example implementation is illustrated using first, second, third, and fourth stages 302, 304, 306, 308. At the first stage 302, a user input is received by the computing device indicating a first endpoint 310, e.g., via a tap of a touchscreen, click of a cursor control device, and so forth.

At the second stage 304, another user input is received indicating a second endpoint 312, e.g., another tap, click, and so forth. This causes the spline handle generation module 202 to connect these points using a segment 314 as part of generating a spline handle 316. This connection may be performed in a variety of ways. The spline handle generation module 202, for instance, may include options to connect these endpoints using a straight line as illustrated at the second stage 304 or via a curve (e.g., using a modifier key) as shown at the third stage 306.

This process may continue to add segments 322, 324 to the spline handle 316. This may be performed sequentially by specifying points successively one after another or by adding segments within existing segments to sub-divide a segment into multiple segments. The spline handle 316 may be defined completely within the artwork 134, partially within the artwork 134, and even completely outside the artwork 134. Other examples are also contemplated, such as by drawing a freeform line by a user. The spline handle generation module 202 may then fit curves (e.g., cubic Bezier curves) automatically and without user intervention to the freeform line to form segments as part of the spline handle 316.

Figure 4:
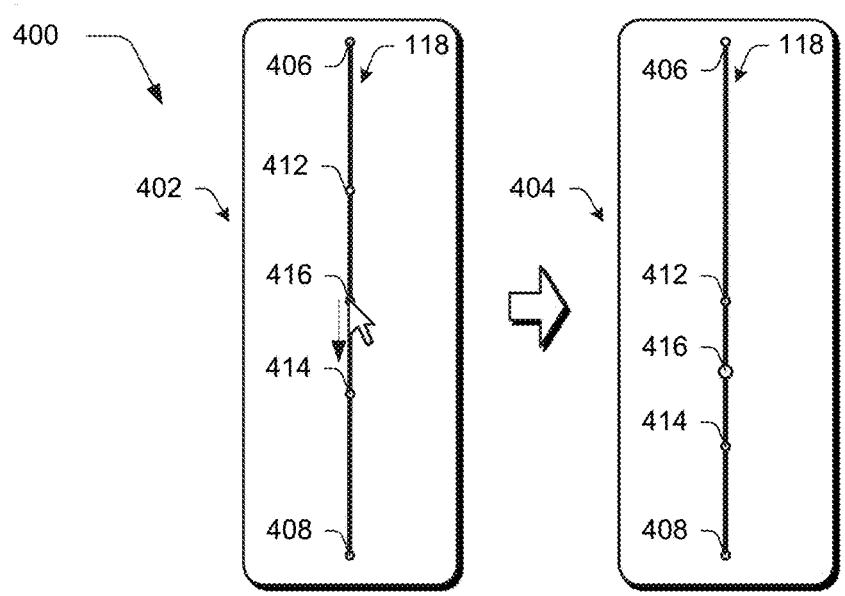
FIGS. 4 and 5 depict examples of use of spline handles as a controlling structure to generate transformations to artwork.
Figure 5:
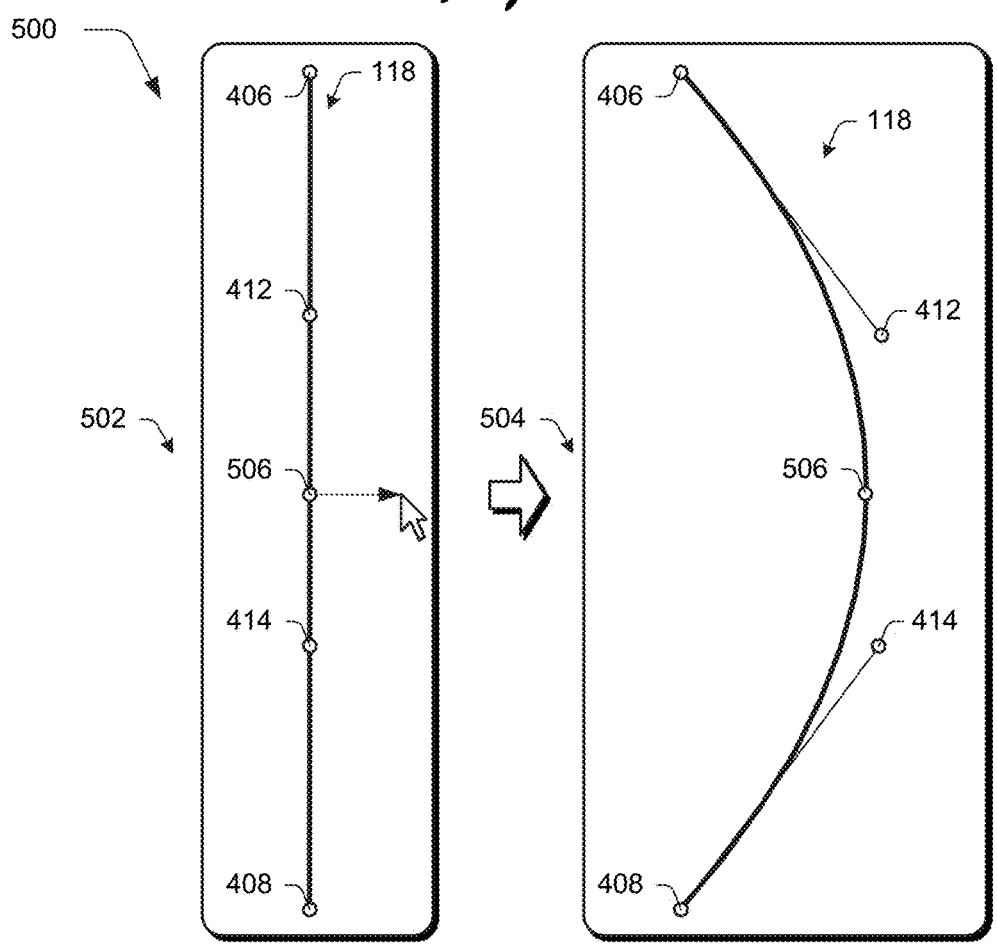

FIGS. 4 and 5 depict examples 400, 500 of use of spline handles as a controlling structure to generate transformations to artwork. FIGS. 4 and 5 are illustrated using respective first stages 402, 502 and respective second stages 404, 504.

A segment of a spline handle 118 is illustrated that includes control points that are used to define a length and direction of a curve. To do so in this example, the control points are configured to support a cubic Bezier curve as having first and second endpoints 406, 408 and first and second tangent handles 412, 414. The tangent handles 412, 414 are used to define a direction of the segment, i.e., a degree to which the segment exhibits curvature. In an implementation, the tangent handles 412, 414 are not displayed in the user interface 110.

Thus, the segment, as defined as a cubic Bezier curve starts at the first endpoint 406 (p0), continues in the direction of the first tangent handle 412 (p1) and arrives at the second endpoint 408 (p3) coming from the direction of the second tangent handle 414 (p2). Unless configured as a straight line as shown the first stages 402, 502, the segment does not pass through the first and second tangent handles 412, 414. An example of this is shown for the second stage 504 of FIG. 5. The distance between the first and second tangent handles 412, 414 determines how far and how fast the curve moves towards the first tangent handle 412 (p1) before turning back toward the second tangent handle 414 (p2).

The spline handle 118 is used as the control structure to generate transformations that are applied to artwork in the digital image. To do so, a user input 208 may be received that selects any point on the segment of the spline handle 118, including any internal point lying on the segment between the first and second endpoints 406, 408. The user input, for instance, may include a "click-and-drag" as selecting an internal point at a first location and moving the internal point to a second location in the user interface 110. This is used by the spline handle generation module 202 to transform the segment, which is then used as a basis to transform the artwork. This may also be performed for multiple segments of a same or different spline handle, simultaneously.

In the example 400 of FIG. 4, an internal point 416 in a straight line segment is selected and moved along the length of the segment. This causes a midpoint of the segment of the spline handle 118 to change, in which case local scaling is applied to respective components of the artwork. Further discussion of this example may be found in relation to FIG. 8.

In the example 500 of FIG. 5, an internal point 506 of the segment is also selected and moved away from the segment. This causes the spline handle generation module 202 to adjust the first and second tangent handles 412, 414 such that the segment also passes through the internal point at it's new location. Additionally, the spline handle generation module 202 may adjust the tangent handles such that the internal point remains "the same" in relation to a length of the segment of the spline handle 118 (i.e., at the same parametric value) as further described below.

In each of these examples, an internal point in the spline handle 118 is moved without moving the first and second endpoints 406, 408. This is not possible using conventional handle types, such as bone handles that were limited to movement of endpoints at "joints" between respective segments.

To support this functionality, pseudo handles may be defined by the digital image transformation system 116 as part of respective segments of the spline handles 118. The pseudo handles are defined at a specific location relative to a segment of the spline handle. For example, parametric values may be used to indicate locations along the segment in relation to a length of the segment. A parametric value "t," for instance, may be defined using values between zero and one, with zero corresponding to a first endpoint 406 and one corresponding to the second endpoint 408. Values between zero and one then indicate "where" internal points along the length of the segment are located in relation to the segment, e.g., a value of "0.5" indicates a midpoint of the segment.

Accordingly, when an internal point of a segment is moved, a new location of the pseudo handle is also recomputed for the segment using the same parametric value. This provides a new location of the pseudo handle as part of regenerating the segment of the spline handle 118 by the spline handle generation module 202. This new location is then used to guide generation of the transformation by the digital image transformation module 204. Thus, each time a user input is received to move a segment of the curve, the user input indirectly modifies each of the pseudo handles that are included as part of that segment. In an implementation, a number of pseudo handles, and location of the pseudo handles, is user selectable to provide a desired amount of precision during user interaction, e.g., a drag operation.

Figure 6:
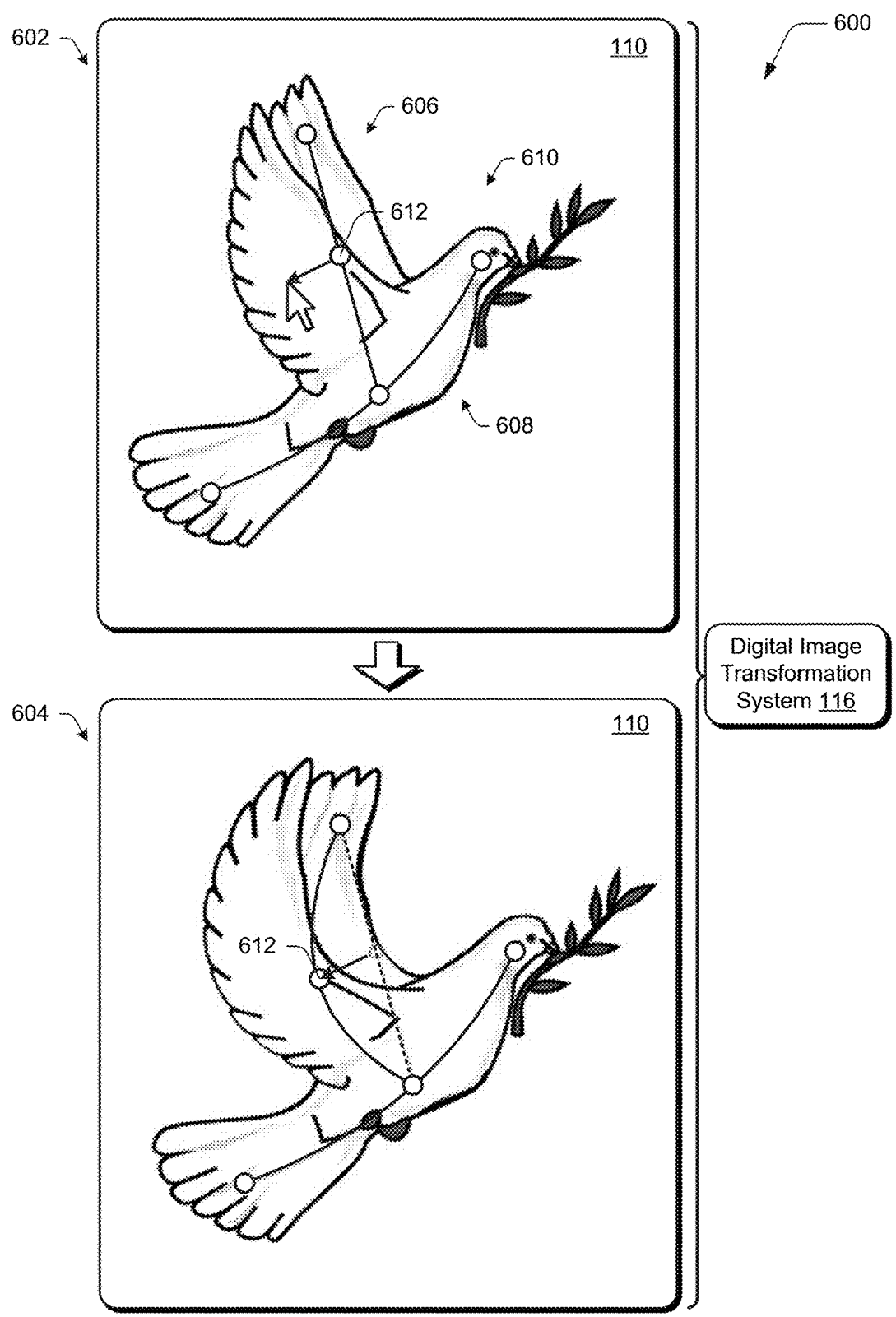
FIG. 6 depicts an example of adjusting curvature of a segment of a spline handle to transform artwork.

FIG. 6 depicts an example 600 of adjusting curvature of a segment of a spline handle to transform artwork. This example 600 includes first and second stages 602, 604. At the first stage 602, first and second spline handles 606, 608 are illustrated as disposed over artwork 610 of a dove. A user input is received via user interaction with the user interface 110 to select an internal point 612 and move that internal point 612 to a new location in the user interface as shown at the second stage 604. This causes the digital image transformation system 116 to regenerate the segment, and based on the regenerated segment, apply a transformation to artwork associated with the segment of the spline handle 606.

Figure 7:
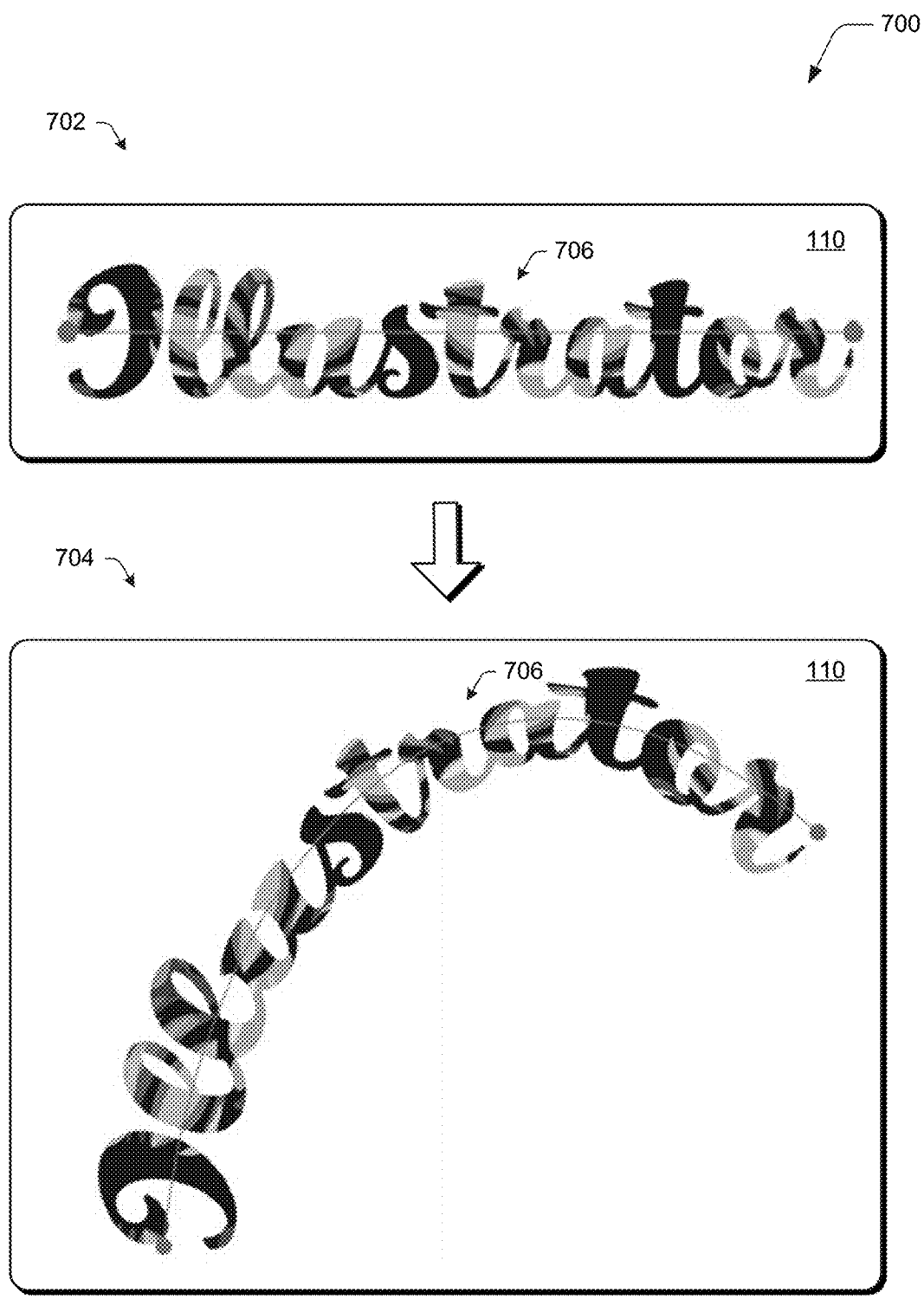
FIG. 7 depicts another example of movement of an internal point on a segment of a spline handle.

FIG. 7 depicts another example 700 of movement of an internal point on a segment of a spline handle. The example is depicted using first and second stages 702, 704 in which a user selection of an internal point on a segment of a spline handle is used to transform text. As illustrated, a user may select from any point along the segment to transform artwork in an intuitive manner.

Figure 8:
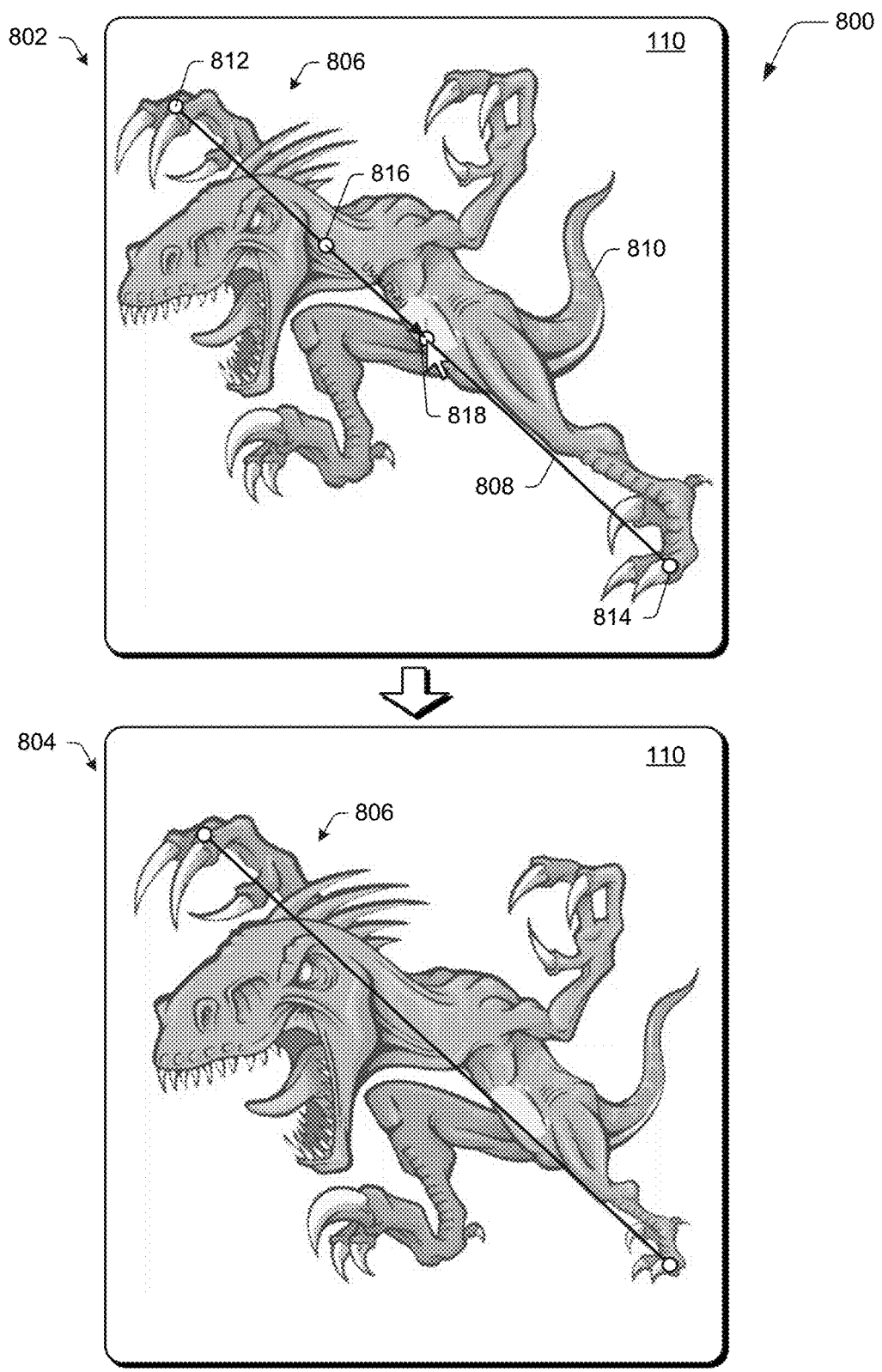
FIG. 8 depicts another example implementation in which localized scaling is performed through interaction with a spine handle.

FIG. 8 depicts another example implementation 800 in which localized scaling is performed through interaction with a spine handle. This example is also illustrated using first and second stages 802, 804. At the first stage 802, a spline handle 806 includes a segment 808 disposed over underlying artwork 810. The spline handle 806 includes first and second endpoints 812, 814. A user input is also received via a cursor control device (e.g., mouse) that selects and moves an internal point from a first location 816 to a second location 818 on the segment 808, e.g., as a "click and drag."

Visually in this example, the spline handle 806 remains the same, a straight line in this example. However, a position of a pseudo handle changes as shown in FIG. 4, which causes local scaling to be applied to the underlying artwork. This is illustrated at the second stage 804 in which a right leg of a raptor gets smaller while the head gets larger, which acts to change a user's perspective in viewing the artwork 806. This is not possible using conventional handle types as part of linear blend skinning. Further discussion of these and other examples is included in the following section.

Implementation Example

Return will now be made back to FIG. 2, in which the digital image transformation system 116 receives a digital image 106 that is to be transformed. The spline handle generation module 202 begins by forming a triangle mesh of nodes and edges that describes the artwork in the digital image and that also includes the spline handle. The triangle mesh, for instance, may be defined as part of the artwork originally (e.g., a vector graphic) or formed from the artwork by the computing device 102 automatically and without user intervention using vector points.

The triangle mesh is used to compute bi-harmonic weights that specify corresponding amounts of transformations that are to be applied to corresponding locations in the artwork. To from the triangle mesh, each segment of each spline handle 118 is flattened by the spline handle generation module 202 to form a polyline using adaptive sampling. The samples are added as Steiner points, with connected polylines used as edges in conjunction with an outline of the artwork to create the triangle mesh with conforming Delaunay Triangulation.

The resulting mesh, and the location of the spline handles 118 on the mesh, is then used to compute bounded bi-harmonic weights to be used to generate the transformation by the digital image transformation module 204. Each of the endpoints for each segment along with its pseudo handle is represented by a weight by the spline handle generation module 202. In one example, the weight of each endpoint and/or pseudo-handle is set to "1" at its location and decreases to zero as a gradient (e.g., linearly) that follows the segment (i.e., edge in the mesh) which connects it to the next handle/point, and is set as "0" everywhere else on the mesh.

Figure 9:
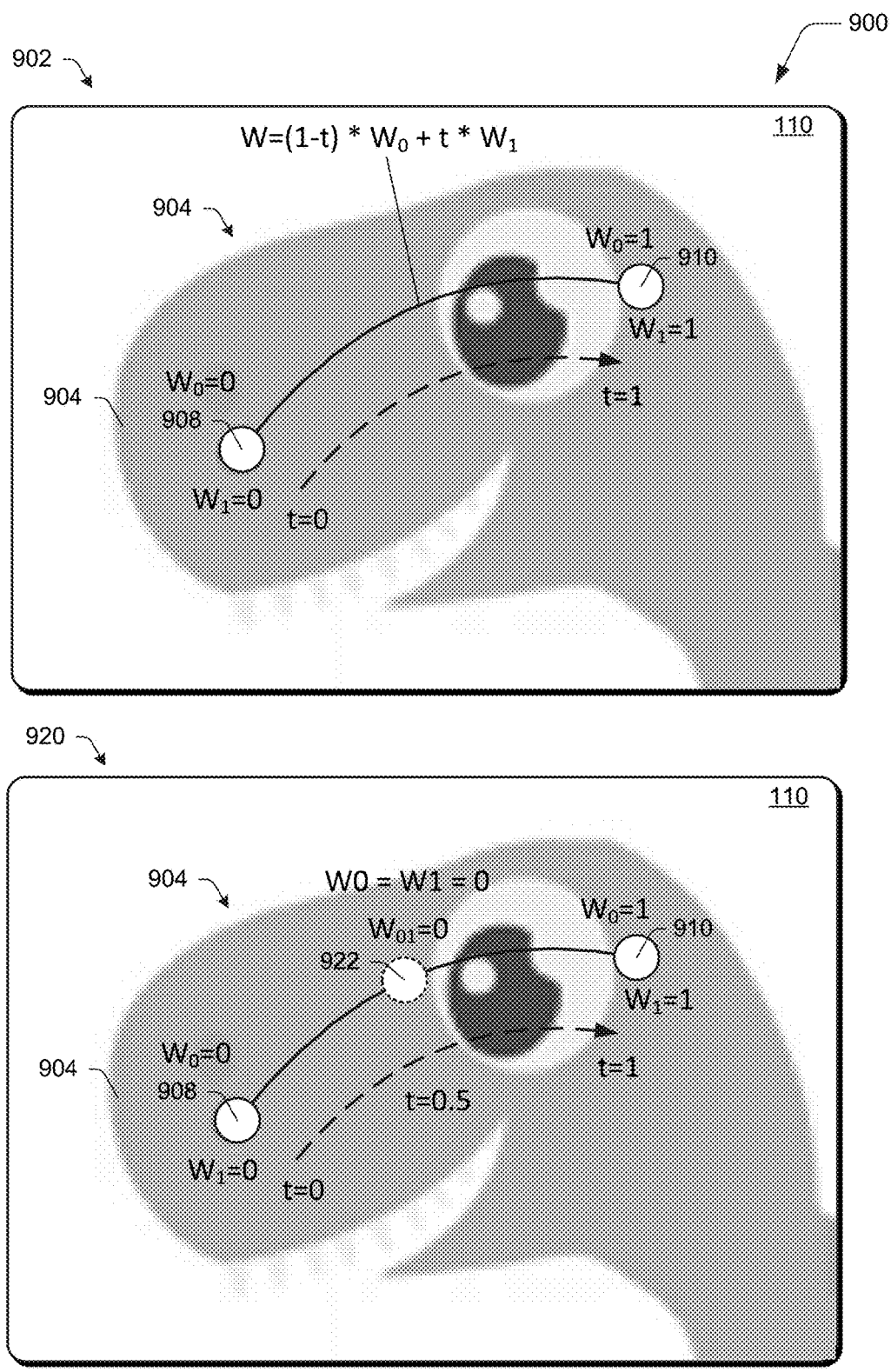
FIG. 9 depicts an implementation of how boundary conditions are set along a spline handle.

FIG. 9 depicts an implementation 900 of how boundary conditions are set along a spline handle. In a first example 902, a spline handle 904 is disposed over artwork 906. The spline handle includes first and second endpoints 908, 910 that define a respective segment of the spline handle 904. Let the weight of the first endpoint 908 be represented by "$W_0$," and the weight of the second handle be represented by "$W_1$." At the location of the first endpoint 908, the weight is set as 1" and linearly decreases to zero along a length of the segment as approaching the next handle, i.e., the second endpoint 910. Similarly, "$W_1$" is zero at the location of the first endpoint 908 and linearly increases along the segment and is "1" at the location of the second endpoint 910.

In a second example 920, boundary conditions are also set using a pseudo handle 922. In this example, a single pseudo handle 922 is included within a segment defined by the first and second endpoints 908, 910. As described above, pseudo handles are not created explicitly by the user in some instance, but are automatically created by the spline handle generation module 202 by subdividing the segment (e.g., a cubic Bezier curve) based on a parametric value "t."

Once the boundary conditions have been set, the spline handle generation module 202 is configured to compute bounded bi-harmonic weights over an entirety of the triangle mesh for each handle. The weight of the handle, and it's transformation matrix are then used by the digital image transformation module 204 to generate a transformation based on user interaction with the spline handle 118.

Figure 10:
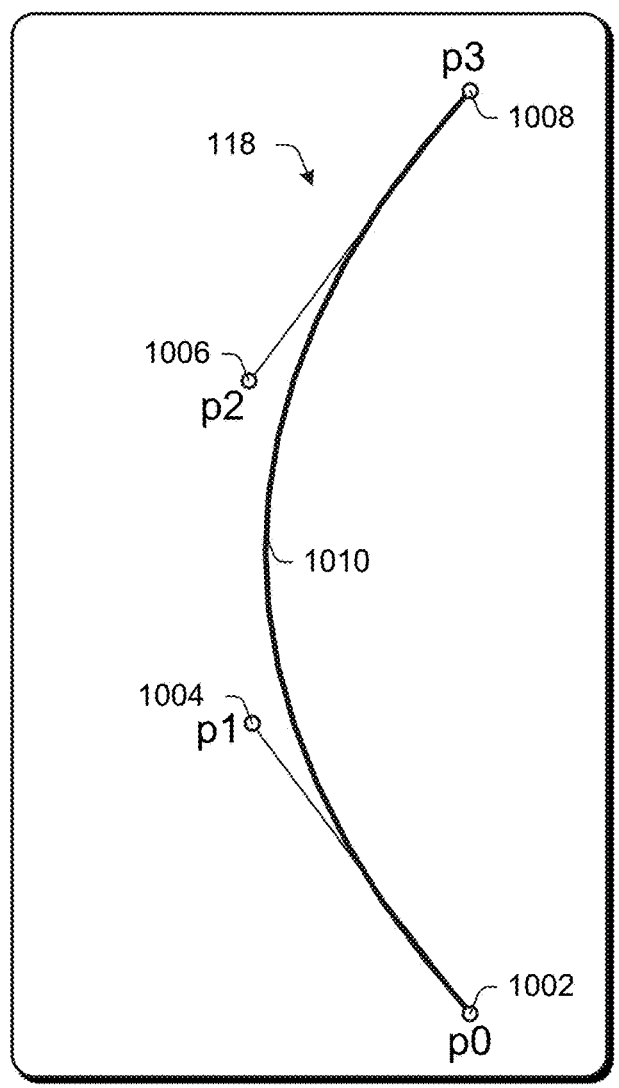
FIG. 10 depicts an example implementation of a spline handle configured as a cubic Bezier curve.

FIG. 10 depicts an example implementation 1000 of a spline handle 118 configured as a cubic Bezier curve. The spline handle 118 includes control points, examples of which include a first endpoint 1002 "p0", a first tangent handle 1004 "p1," a second tangent handle 1006 "p2," and a second endpoint 1008 "p3" that form a segment 1010, which is a curve in this example.

When a user input 208 is received to move an internal point between the first and second endpoints 1002, 1008 from a first location to a second location, the spline handle generation module 202 refits the segment to pass through the second location by transforming its control points, i.e., the endpoints and/or the tangent handles. To do so, a value "delta" is calculated that represents a distance between the first location and the second location, e.g., "where the drag started" and a current cursor position in the user interface 110. The spline handle generation module 202 regenerates the segment of the spline handle 118 to ensure it is at the same relative location with respect to a length of the segment (i.e., same parametric value "t"). For example, if the internal point correspond to "t=0.3," the internal point, as disposed at the second location remains at "t=0.3" with respect to a length of the segment. The spline handle generation module 202 may refit the segment in a variety of ways, an example of which is expressed as follows:

Let denom=3*(1−t)*(1−t)*(1−t)*t+3*(1−t)*t*t*t;

p1$_{new}$=p1+delta*(1−t)/denom; and p2$_{new}$=p2+delta*(1−t)/denom; and

The values "p1$_{new}$" and "p2$_{new}$" are the new control points for the regenerated segment 1010 of the spline handle 118. Thus, the tangent handles are adjusted in this example such that the curve includes the internal point at the second location as well as a same relative location with respect to a length of the segment, i.e., same parametric value. In one example, $C_0$ continuity between adjacent segments of a spline handle 118 is maintained such that adjacent segments are not smoothed. As a result, control points of a previous segment and/or next adjacent segment are not modified. This limits an image of the transformation to an area of an artwork, which leads to predictable behavior.

The digital image transformation module 204 is then employed to generate a transformation based on the regenerated segment of the spline handle 118. To do so, once the "new" second locations of the control points (e.g., tangent handles and/or endpoints) of the regenerated segment of the spline handle 118 are determined, these control points are used for computing components of a transformation. Transformations may include translation, rotation, and/or scaling.

For a given spline handle 118, a transformation matrix may be formed as a 3×3 square matrix, an example of which follows:

$$T_1 = \begin{bmatrix} a_{11} & a_{12} & a_{13} \\ a_{21} & a_{22} & a_{23} \\ a_{31} & a_{32} & a_{33} \end{bmatrix}$$

In the above matrix, the values of $a_{13}$ and $a_{23}$ define translation in x and y directions, the values $a_{11}$, $a_{12}$, $a_{21}$, $a_{22}$ represent scale and rotation along x and y axes, respectively, and the values $a_{31}$, $a_{32}$, $a_{33}$ are added for homogeneity. Scale, rotation, and translation are concatenated in the order to apply transformations. "T" is initialized as an identity matric for each control point as follows:

$$T_1 = \begin{bmatrix} 1 & 0 & 0 \\ 0 & 1 & 0 \\ 0 & 0 & 1 \end{bmatrix}$$

In order to address repeated (e.g., incremental) operations in real time, the transformations are generated by the digital image transformation module 204 from an original base state of the artwork. Accordingly, in order to apply a subsequent transformation, the previous transformations that are applied to the artwork are inverted, before applying the new transformation again from the base state.

Using the originally generated segment of the spline handle 118 and the regenerated segment of the spline handle 118, the transformation may be generated by the digital image transformation module 204 as follows. For a given segment of a spline handle 118, let $P_{base}$ and $P_{cur}$ represent corresponding original and current position of the handle and let $T_{base}$ and $T_{baseNorm}$ denote the tangent and normalized tangent vector of the tangent handle in the original segment and similarity let $T_{cur}$ and $T_{curNorm}$ denote a tangent and normalized tangent vector of the tangent handle in the regenerated segment of the spline handle 118.

The digital image transformation module 204 first translates the segment of the spline handle 118 back to its origin from a current segment, if not already at its origin. A rotation component is also removed by the module that may exist due to an initial position of tangents of the tangent handles. This may be performed such that the final transformation is correctly applied to avoid non-uniform scaling that may result in artwork getting skewed if it's rotated, or rotation that might not give correct results if not translated by to an original version, first.

The rotation component in the transformation matrix above may be represented as follows:

$a_{11}$=cos θ;
$a_{12}$=−sin θ;
$a_{21}$=sin θ; and
$a_{22}$=cos θ.

The value "θ" (Theta) is a rotation angle. Because normalized vectors are used, these values may be directly computed by the digital image transformation module 204 by taking x and y components of the vector.

To compute the inverse of an initial spline position rotation, a rotation matrix is computed with a $-T_{base}$ vector. Accordingly, the transformation becomes:

$$T_2 = T_1 * \underbrace{\begin{bmatrix} 1 & 0 & -P_{base} \cdot x \\ 0 & 1 & -P_{base} \cdot y \\ 0 & 0 & 1 \end{bmatrix}}_{\{\text{invert translation}\}} * \underbrace{\begin{bmatrix} T_{baseNorm} \cdot x & T_{baseNorm} \cdot y & 0 \\ -T_{baseNorm} \cdot y & T_{baseNorm} \cdot x & 0 \\ 0 & 0 & 1 \end{bmatrix}}_{\{\text{invert rotation}\}}$$

In the above expression, $T_2$ represents the matrix that inverts the rotation and translation component of a based state of the spline handle 118. A transformation matrix is then computed to generate a current transformation. Scale factor is computed as a ratio of lengths of tangents of current and initial tangent handles, e.g., $T_{cur}/T_{base}$. This T represents a final transformation matrix corresponding to the control point. In a similar fashion, the digital image transformation module 204 generates transformation matrices for each of the handles of the segment, with a final transformation computed using a weighted combinations of the transformations.

In this way, the digital image transformation system 116 overcomes the challenges and inefficiencies of conventional handle types when used as part of linear blend skinning techniques to support use of fewer handles that enables real time feedback, even on devices having limited processing power. The spline handles also support relative scaling to different components of artwork by "dragging points along the segment," which is not possible using conventional techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-10.

Figure 11:
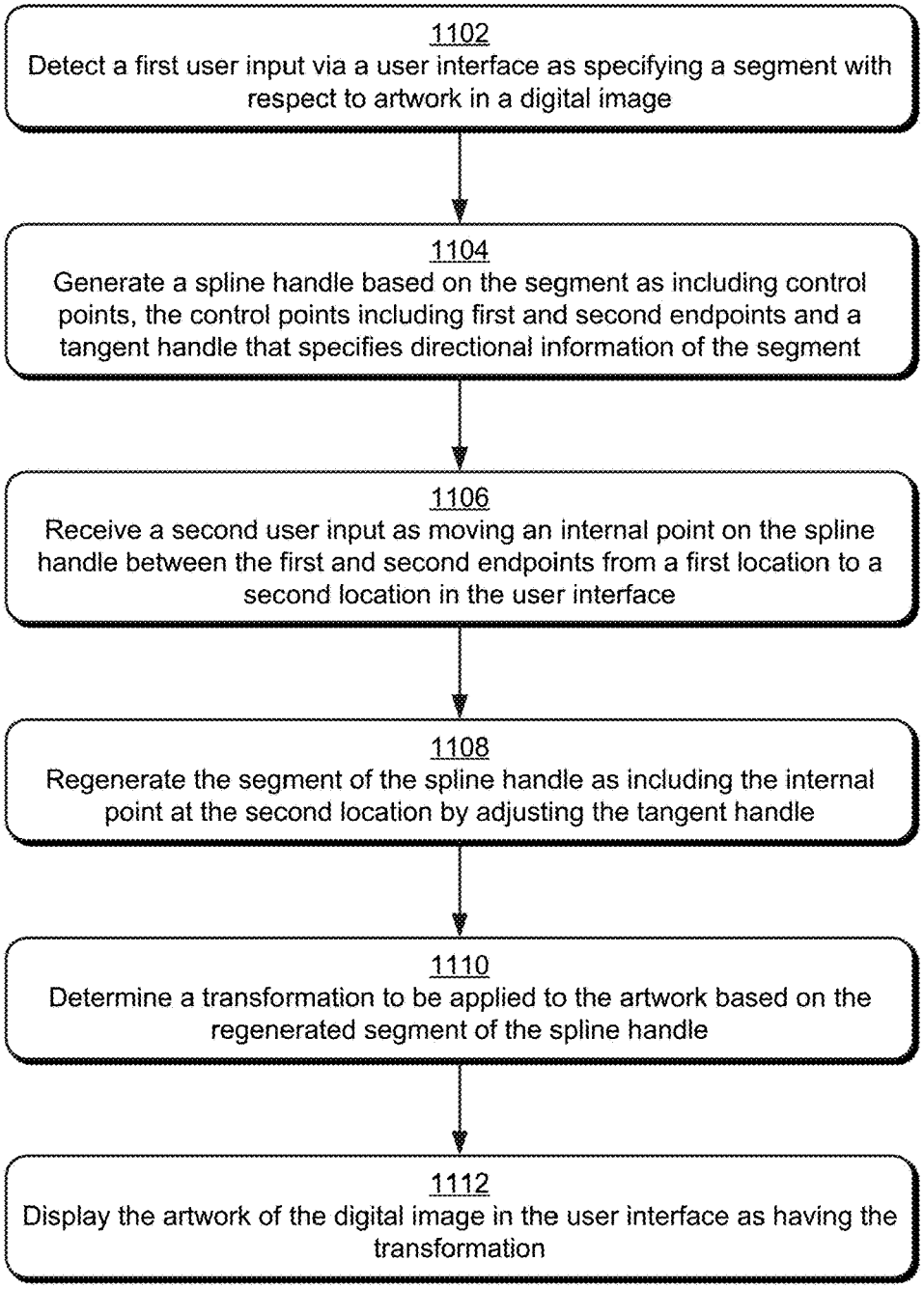
FIG. 11 is a flow diagram depicting a procedure in an example implementation in which in which a transformation is generated that may include translation, rotation, and/or scaling based on user interaction with a spline handle.

FIG. 11 depicts a procedure 1100 in an example implementation in which a transformation is generated based on user interaction with a spline handle. A first user input is detected via a user interface as specifying a segment with respect to artwork in a digital image (block 1102). A user, for instance, may enter a series of points that define a segment as shown in FIG. 3, input a freeform line, and so forth using touchscreen functionality, a cursor control device, and so forth that is detected by the computing device 102.

In response, a spline handle is generated by a spline handle generation module 202 of the computing device 102 based on the segment as including control points. The control points including first and second endpoints and a tangent handle that specifies directional information of the segment (block 1104), e.g., as part of a cubic Bezier curve.

A second user input is then received as moving an internal point on the spline handle between the first and second endpoints from a first location to a second location in the user interface (block 1106). This may be performed "on" the segment to specify localized scaling as shown and described in relation to FIG. 8, may be moved "off segment" to change a curvature and/or size of the segment as shown and described in relation to FIGS. 6 and 7, and so forth.

In response, the spline handle generation module 202 regenerates the segment of the spline handle as including the internal point at the second location by adjusting the tangent handle (block 1108). In an implementation, this also causes the internal point to remain at the same relative location along a length of the segment, i.e., same parametric value "t."

Next, a digital image transformation module 204 is employed to determine a transformation to be applied to the artwork based on the regenerated segment of the spline handle (block 1010). This may be performed in a variety of ways, such as through use of a transformation matrix as described above. The artwork of the digital image is then displayed (e.g., rendered on the display device 112) by the computing device in a user interface 110 as having the transformation. In an implementation, this is performed in real time in the user interface as the user input is received that moves the internal point.

Figure 12:
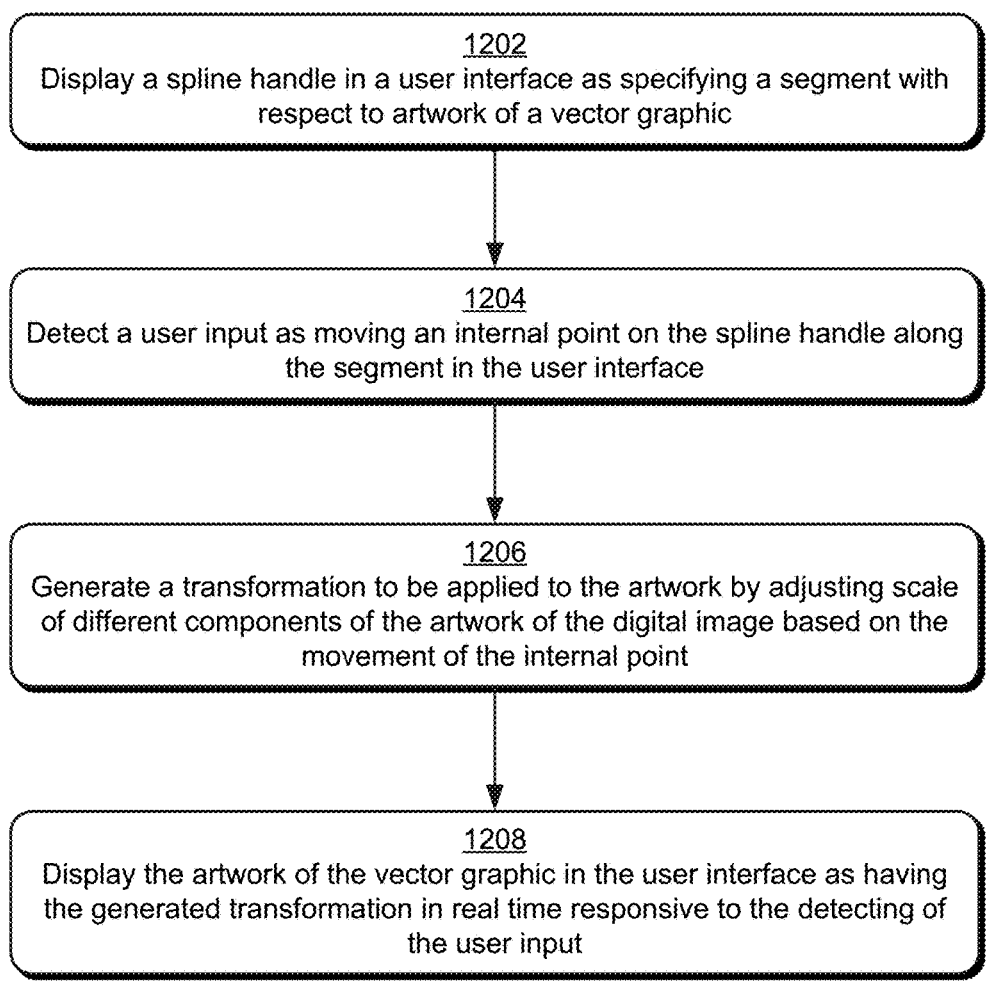
FIG. 12 is a flow diagram depicting a procedure in an example implementation in which in which a transformation is generated that includes localized scaling based on user interaction with a spline handle.

FIG. 12 depicts a procedure 1200 in an example implementation in which a transformation is generated that includes localized scaling based on user interaction with a spline handle. A spline handle 806 is displayed in a user interface 110 as specifying a segment with respect to artwork of a vector graphic (block 1202). The spline handle 806, for instance, may have been input by specifying the endpoints of a segment as shown and described in relation to FIG. 2, as a freeform line, and so forth.

A user input is detected by the spline handle generation module 202 as moving an internal point on the spline handle 118 along the segment in the user interface (block 1204), e.g., from a first location 816 to a second location 818.

In response, a digital image transformation module 204 generates a transformation to be applied to the artwork by adjusting a scale of different components of the artwork of the digital image based on the movement of the internal point (block 1206). The artwork of the vector graphic is then displayed in the user interface 110 as having the generated transformation in real time responsive to the detecting of the user input (block 1208). In the illustrated example of FIG. 8, for instance, this is used to increase a scale of a head by decrease the scale of the right foot by moving a midpoint of the segment of the spline handle, and thus the corresponding control points.

Example System and Device

Figure 13:
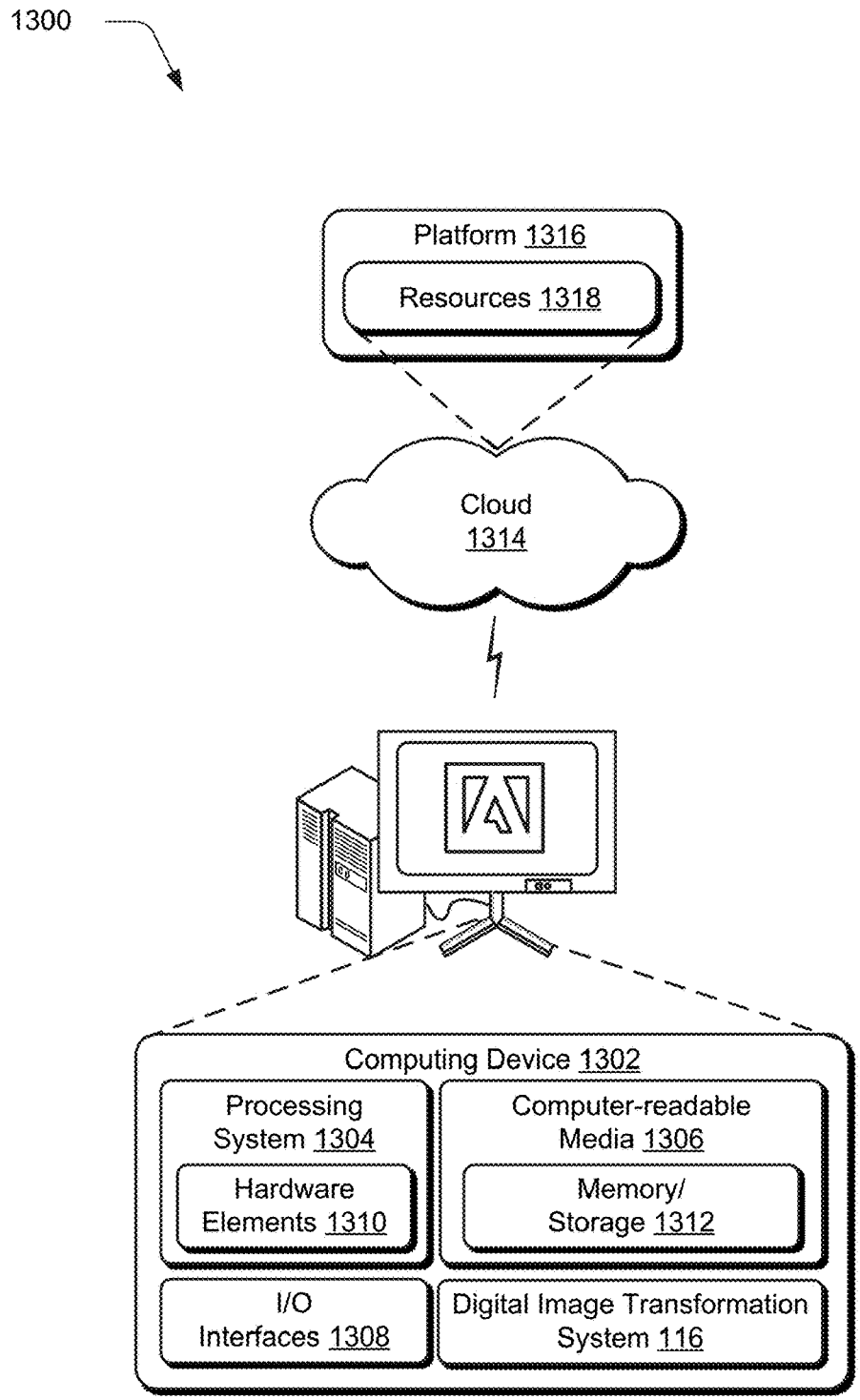
FIG. 13 illustrates an example system including various components of an example device that can be implemented as any type of computing device as described and/or utilize with reference to FIGS. 1-12 to implement embodiments of the techniques described herein.

FIG. 13 illustrates an example system generally at 1300 that includes an example computing device 1302 that is representative of one or more computing systems and/or devices that may implement the various techniques described herein. This is illustrated through inclusion of the digital image transformation system 116. The computing device 1302 may be, for example, a server of a service provider, a device associated with a client (e.g., a client device), an on-chip system, and/or any other suitable computing device or computing system.

The example computing device 1302 as illustrated includes a processing system 1304, one or more computer-readable media 1306, and one or more I/O interface 1308 that are communicatively coupled, one to another. Although not shown, the computing device 1302 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1304 is representative of functionality to perform one or more operations using hardware. Accordingly, the processing system 1304 is illustrated as including hardware element 1310 that may be configured as processors, functional blocks, and so forth. This may include implementation in hardware as an application specific integrated circuit or other logic device formed using one or more semiconductors. The hardware elements 1310 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1306 is illustrated as including memory/storage 1312. The memory/storage 1312 represents memory/storage capacity associated with one or more computer-readable media. The memory/storage component 1312 may include volatile media (such as random access memory (RAM)) and/or nonvolatile media (such as read only memory (ROM), Flash memory, optical disks, magnetic disks, and so forth). The memory/storage component 1312 may include fixed media (e.g., RAM, ROM, a fixed hard drive, and so on) as well as removable media (e.g., Flash memory, a removable hard drive, an optical disc, and so forth). The computer-readable media 1306 may be configured in a variety of other ways as further described below.

Input/output interface(s) 1308 are representative of functionality to allow a user to enter commands and information to computing device 1302, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1302 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1302. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1302, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1310 and computer-readable media 1306 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1310. The computing device 1302 may be configured to implement particular instructions and/or functions corresponding to the software and/or hardware modules. Accordingly, implementation of a module that is executable by the computing device 1302 as software may be achieved at least partially in hardware, e.g., through use of computer-readable storage media and/or hardware elements 1310 of the processing system 1304. The instructions and/or functions may be executable/operable by one or more articles of manufacture (for example, one or more computing devices 1302 and/or processing systems 1304) to implement techniques, modules, and examples described herein.

The techniques described herein may be supported by various configurations of the computing device 1302 and are not limited to the specific examples of the techniques described herein. This functionality may also be implemented all or in part through use of a distributed system, such as over a "cloud" 1314 via a platform 1316 as described below.

The cloud 1314 includes and/or is representative of a platform 1316 for resources 1318. The platform 1316 abstracts underlying functionality of hardware (e.g., servers) and software resources of the cloud 1314. The resources 1318 may include applications and/or data that can be utilized while computer processing is executed on servers that are remote from the computing device 1302. Resources 1318 can also include services provided over the Internet and/or through a subscriber network, such as a cellular or Wi-Fi network.

The platform 1316 may abstract resources and functions to connect the computing device 1302 with other computing devices. The platform 1316 may also serve to abstract scaling of resources to provide a corresponding level of scale to encountered demand for the resources 1318 that are implemented via the platform 1316. Accordingly, in an interconnected device embodiment, implementation of functionality described herein may be distributed throughout the system 1300. For example, the functionality may be implemented in part on the computing device 1302 as well as via the platform 1316 that abstracts the functionality of the cloud 1314.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital image transformation environment, a method implemented by a computing device, the method comprising:
    detecting, by the computing device, a first user input via a user interface as specifying a segment disposed over a mesh of an underlying artwork in a digital image;
    generating, by the computing device, a spline handle based on the segment as including control points, the control points including first and second endpoints and a tangent handle that specifies directional information of the segment;
    receiving, by the computing device, a second user input as moving an internal point on the spline handle between the first and second endpoints from a first location to a second location in the user interface;
    regenerating, by the computing device, the segment of the spline handle as including the internal point at the second location by adjusting the tangent handle;
    determining, by the computing device, a transformation to be applied to the mesh of the underlying artwork based on the regenerated segment of the spline handle; and
    displaying, by the computing device, the underlying artwork of the digital image in the user interface as having the transformation.

2. The method as described in claim 1, wherein the segment and the regenerated segment are defined using respective cubic Bezier curves.

3. The method as described in claim 1, wherein the regenerating, the determining, and the displaying are performed in real time by the computing device in response to the receiving of the user input as moving the internal point.

4. The method as described in claim 1, wherein the transformation results in application of relative scale to the artwork in proportion to a length of the spline handle based on a change in location of a mid-point of the spline handle caused by the moving of the internal point from the first location to the second location.

5. The method as described in claim 1, wherein the regenerating includes:
    determining a parametric value of the internal point at the first location relative to the segment of the spline handle;
    calculating displacement of the internal point from the first location to the second location; and
    adjusting the tangent handle such that the internal point remains at the determined parametric value for the regenerated segment based at least in part on the calculated displacement.

6. The method as described in claim 1, further comprising adding, by the computing device automatically and without user intervention, at least one pseudo handle to the spline handle at a specific location relative to the segment as defined by a parametric value and wherein the regenerating of the segment includes determining an adjusted location of the at least one pseudo handle using the parametric value.

7. The method as described in claim 6, wherein the determining of the transformation includes calculating bi-harmonic weights indicating amounts of the transformation to be applied to respective portions of the underlying artwork is based on the first and second endpoints and the at least one pseudo handle.

8. The method as described in claim 1, wherein the transformation includes translation or rotation of the artwork.

9. The method as described in claim 1, wherein the transformation includes scaling the underlying artwork.

10. The method as described in claim 1, wherein:
    the segment is a first segment that is joined with a second segment via respective endpoints in the user interface that forms the spline handle; and
    applying the transformation to the first segment maintains $C_0$ continuity with the second segment such that the second segment is not smoothed based on the applying of the transformation to the first segment.

11. The method as described in claim 1, wherein the underlying artwork of the digital image is a vector graphic.

12. The method as described in claim 1, wherein the receiving, the regenerating, the determining, and the displaying are performed by the computing device in the user interface simultaneously for a plurality of said segments.

13. The method as described in claim 1, wherein the first user input is a freeform line.

14. In a digital image transformation environment, a method implemented by a computing device, the method comprising:
    displaying, by the computing device, a spline handle in a user interface as specifying a segment with respect to a mesh of an underlying artwork of a vector graphic;
    detecting, by the computing device, a user input as moving an internal point on the spline handle along the segment in the user interface;
    generating, by the computing device, a transformation to be applied to the mesh by adjusting scale of different components of the mesh based on the movement of the internal point; and
    displaying, by the computing device, the underlying artwork of the vector graphic in the user interface as having the generated transformation in real time responsive to the detecting of the user input.

15. The method as described in claim 14, wherein the generating of the transformation results in adjusting relative scale of the underlying artwork in proportion to a length of the spline handle in relation to the movement of the internal point.

16. In a digital image transformation environment, a system comprising:

a spline handle generation module implemented at least partially in hardware of a computing device to:
  generate a spline handle having a segment disposed over a mesh of underlying artwork in a digital image, the spline handle including control points, the control points including first and second endpoints and a tangent handle that specifies directional information of the segment; and
  regenerate the segment of the spline handle as including an internal point of the segment moved responsive to a user input from a first location to a second location in the user interface, the regenerating performed by adjusting the tangent handle; and
a digital image transformation module implemented at least partially in hardware of the computing device to generate and display a transformation on the mesh of the underlying artwork in the user interface in real time based on the regenerated segment of the spline handle.

17. The system as described in claim 16, wherein the segment and the regenerated segment are defined using respective cubic Bezier curves.

18. The system as described in claim 16, wherein the transformation includes translation or rotation of the artwork.

19. The system as described in claim 16, wherein the transformation includes scaling the underlying artwork.

20. The system as described in claim 16, wherein the underlying artwork is a vector graphic.

* * * * *